2 Sheets--Sheet 2.

A. LOWE.
Wind-Powers.

No. 167,347.

Patented Aug. 31, 1875.

WITNESSES:
W. W. Hollingsworth
Colon C. Kernon

INVENTOR:
Austin Lowe
BY
ATTORNEYS.

UNITED STATES PATENT OFFICE.

AUSTIN LOWE, OF SALINA, KANSAS, ASSIGNOR OF TWO-THIRDS HIS RIGHT TO D. C. SKINNER AND THOMAS E. SKINNER.

IMPROVEMENT IN WIND-POWERS.

Specification forming part of Letters Patent No. 167,347, dated August 31, 1875; application filed May 10, 1875.

*To all whom it may concern:*

Be it known that I, AUSTIN LOWE, of Salina, in the county of Saline and State of Kansas, have invented a new and useful Improvement in Wind-Power; and I do hereby declare the following to be a full, clear, and exact description of the same, reference being had to the accompanying drawing, forming part of this specification.

This invention has for its object to furnish a portable wind-power, designed for propelling wheeled carriages used for transporting loads and for furnishing a prime motor for operating thrashing-machines, churns, plows, and other agricultural machines.

The invention consists, first, in the combination of two horizontally-revolving wind-wheels turning in opposite directions and mounted on independent shafts, which are arranged at an angle to the horizon, the wind-wheels being also provided with pivoted self feathering or adjusting sails, which are connected with a governing mechanism of the character hereinafter fully described. The invention consists in the provision of wind-wheels of a conoidal or dished form, comprising a skeleton frame of the proper shape, in which are mounted or arranged a series of blades or sails, gradually increasing in size from the front of the frame, connected together in sets, and combined with mechanism which is so arranged as to always maintain the sails in proper relation to the wind for receiving the propelling force until the advent of a sudden gale or violent wind causes the sails, by reason of their peculiar attachment and centrifugal force of the wheel, to overcome the weight of the governing devices, thus feathering or causing the sails to present their edges to the wind until the latter decreases, when the weighted mechanism returns the sails to their normal position.

Figure 1:
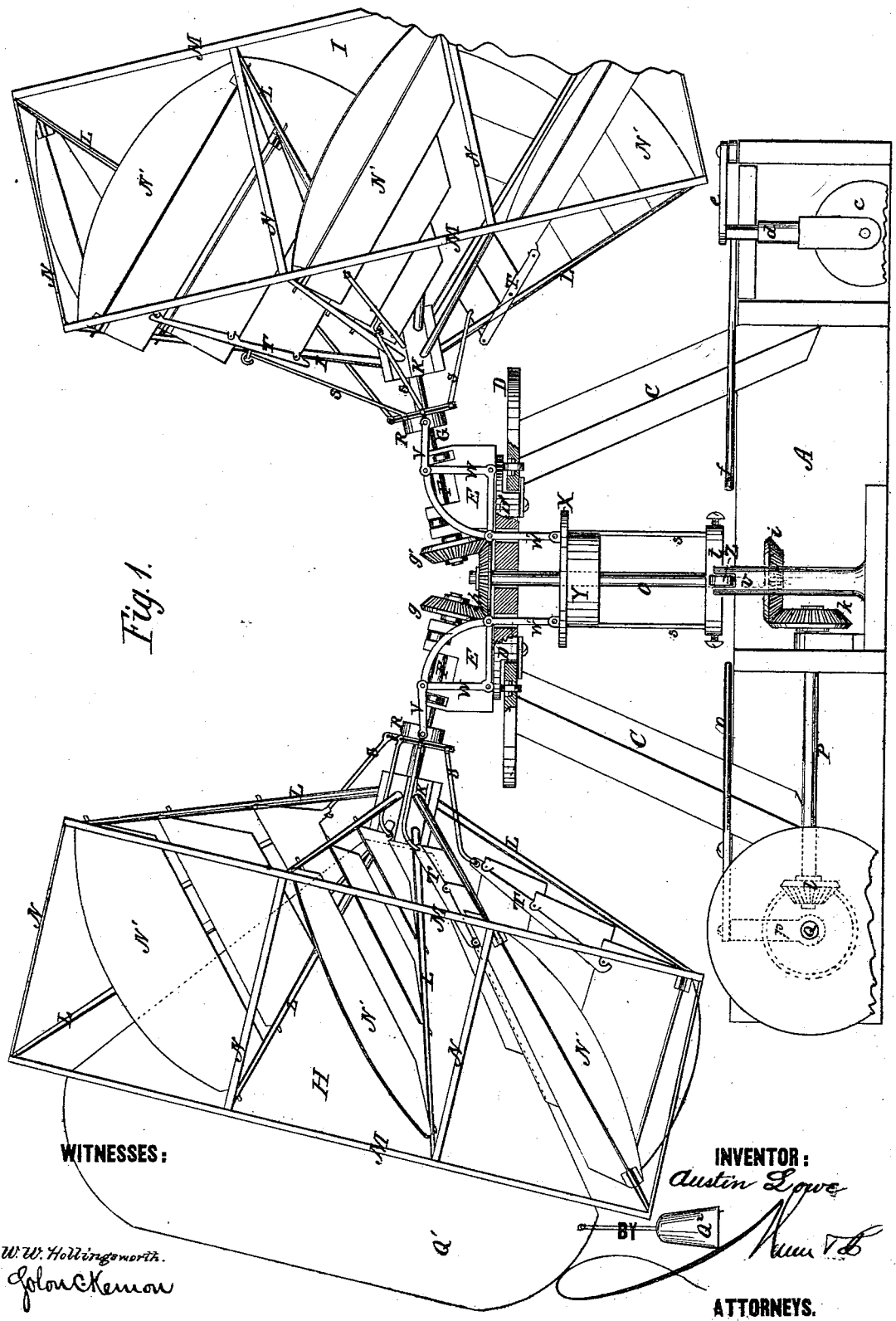
Figure 2:
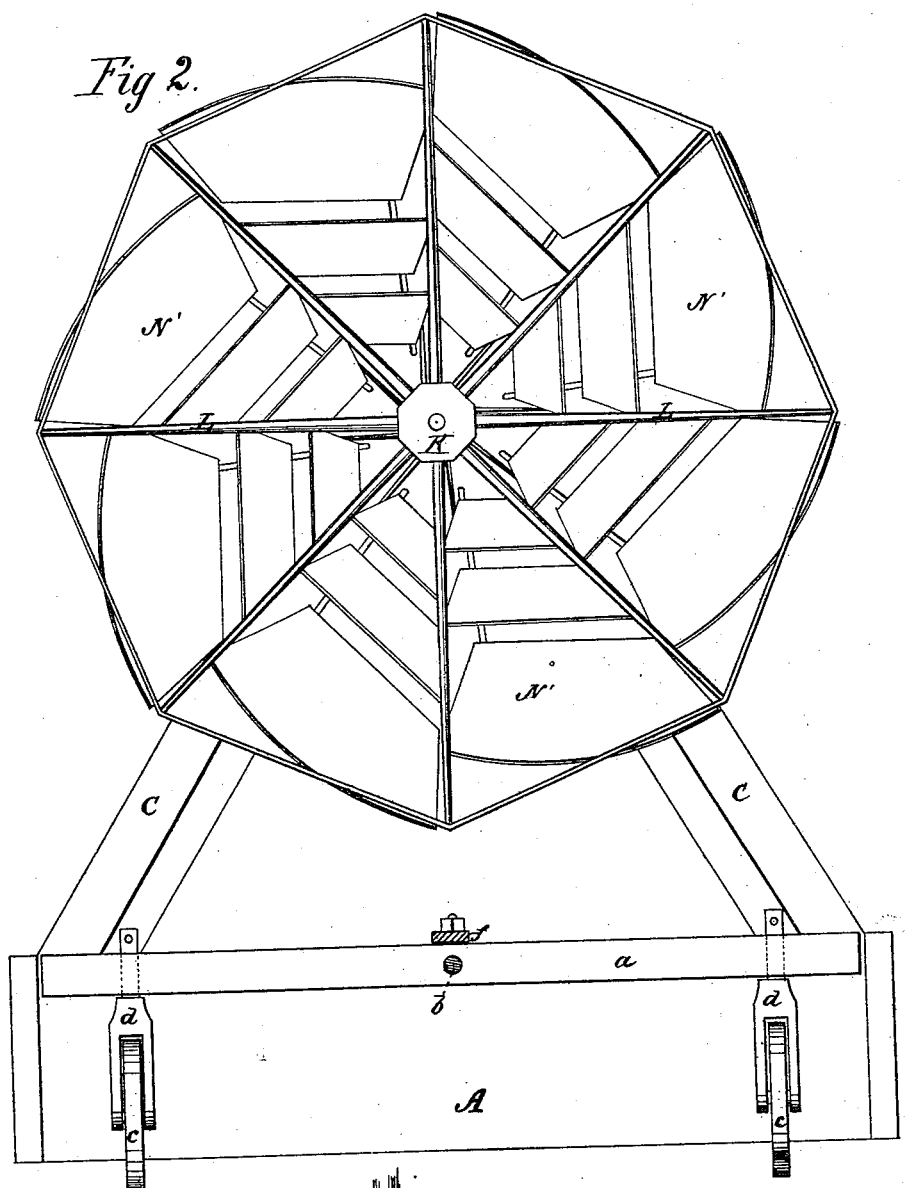
Figure 3:
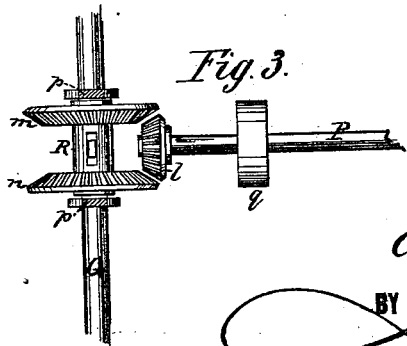

In the drawing, Figure 1 is a side elevation, partly in section; Fig. 2, a front elevation; Fig. 3 a detail view of the shifting-gear.

The letter A designates a wheeled frame or carriage, sustaining or receiving the entire operative mechanism, and provided at its forward end with a transverse bolster or beam, a, which is hung on a central horizontal fulcrum-shaft, b, and carries a pair of caster or guide wheels, c c, the vertical stems d of which extend through the bolster, and are attached to a connecting-arm, e, which is provided with vibrating horizontal lever, f.

By means of said lever the wheels may be turned for steering the carriage, and the pivoted bolster always accommodating itself to the surface of the ground, the level position of the carriage is maintained.

The operative mechanism or wind-wheels are sustained upon an elevated platform, D, which is attached to vertical posts or standards C. Upon said platform is arranged a turn-table, D', which is formed or provided with bearing-blocks E, located on opposite sides of its center for receiving and supporting the shafts F G of the wind-wheels H I. Said shafts are arranged at an angle of about eighteen degrees to the horizon by inserting their inner or depressed ends in bearings or boxes at a lower plane than the front boxes.

Anti-friction-rollers may be resorted to, as shown in the drawing, for preventing the heating and effecting the proper movement of the wheel-shafts.

To the outer or elevated end of each wheel-shaft is applied a hub, K, from which radiate in an outward direction a series of arms, L, arranged in pairs, or one in the rear of the other, and connected or possessing at their outer extremities surrounding rims M and connecting-braces N. The rear arms and rim being shorter than the front arms and rims, a skeleton frame is formed of a conoidal or dished shape, which is designed for the reception of pivoted blades or sails N'. Said blades are provided with gudgeons, journaled in the radial arms L, and are arranged in sets of three or more, which diminish in size from the rim to the hub of the frame.

When the mill is in action, the sails have their faces presented to the wind, and, by reason of the conoidal or dished shape of the wheels, the force of the wind is effectually exerted upon a greater area or surface than in windmills heretofore constructed. The two sets of wind-wheels are so arranged that they will be on opposite sides of the mill at all times, and that wheel which is in the eye of the wind receives the full force of the same upon its front or dished surface, while the rear wheel receives the wind upon its rear surface. A simultaneous rotation is thus imparted to wheel-shafts, but in opposite directions, as the corresponding faces of the sails or blades are inclined in opposite planes in relation to each other and to the receiving-frames.

Motion is transmitted from the wheel-shafts to a main or vertical power-shaft, O, through the medium of bevel-gearing $g$ $g'$ $h$ applied respectively to the ends of the shafts. To the lower end of the power-shaft O is connected a bevel-wheel, $i$, which meshes into a corresponding wheel, $k$, on a longitudinal shaft, P, to the opposite or rear end of which is applied a second bevel or crown wheel, $l$, for transmitting motion to the driving-axle Q of the vehicle.

A sleeve, R, capable of being moved horizontally on the axle O, but locked to the same for causing their simultaneous rotation, carries two bevel-wheels, $m$ $n$, which are susceptible of being interchangeably thrown in contact with the wheel $l$ on the shaft P, for effecting the movement of the vehicle in reverse directions, or of being entirely disconnected for arresting the movement of the vehicle when it is designed to use the power for operating stationary machinery. This adjustment of the sleeve and driving-gear is effected by means of a horizontal lever, $o$, provided with a stirrup or bifurcated arms, $p$, extending on both sides of the sleeve. A suitable retaining device is combined with the shifting-lever for securing the same in a stationary position.

The power for operating stationary objects, such as thrashing-machines, grindstones, sawing-machines, &c., is derived from a belt-pulley, $q$, on the longitudinal shaft P.

It will be apparent that the two sets of wheels will balance each other, and by making one set larger than the other a vane for turning the sails to the wind is dispensed with, as the larger wheel acts as a vane, but when the wheels are of a corresponding size I employ a vane, Q', which is journaled in the hub of the rear wheel, as shown in the drawing, and carries a weight, $Q^2$, for maintaining it in a vertical position.

In order to prevent injury of the machinery or irregularity of speed caused by sudden gales or gusts of winds, I arrange the sails in such a manner and combine them with governing devices, so that in the event of a sudden gale the sails will be automatically feathered and retained in an inoperative position, or comparatively so, until the wind decreases, when they are immediately returned to their normal position for further action. These results are effected by pivoting the sails near their edges, so that the preponderance of the wind being on one side of the axis the sails will, in the event of a violent gale, be turned for presenting their edges to the wind, and be so retained until the wind decreases in violence, when a weighted governing mechanism is brought into action for returning the sails to their normal position. This regulating or governing mechanism consists of a sliding spider or sleeve, R, arranged on the wheel-shaft, and connected to the series of sails by links S, which are attached to bars T, pivoted to each set of sails. The spider R is embraced by a swiveled yoke, which is, by means of arms V, connected to quadrants or elbow-cranks W, which possess pendent links, W', extending through the turn-table of the mill, and attached at their lower ends to a disk or head, X, rotating on a hub or collar, Y, encircling the power or main shaft of the mill, and guided in its vertical movement by stems on the lower side of the turn-table. To said collar are applied vertical extensions or arms $s$, which terminate in a rim, $t$, surrounding the power-shaft near its base. A yoke carried or formed on a lever, Z, surrounds said rim $t$, and is attached to the same. The fulcrum of the lever is at its rear end, as shown at $v$; and to the front end of the same is applied a weight or weights, which always exert sufficient pressure upon the lever and connecting mechanism for retaining the sails in an operative position during moderate winds.

If the wheel, by any of the causes above assigned, revolves at above a certain speed, the centrifugal force and preponderance of the wind upon one side of the axis of the sails will cause the latter to turn so as to offer little or no resistance to the wind.

This automatic movement of the sails causes the governing mechanism above described to be operated, thus elevating the lever and weight, and retaining it so until the wind decreases, when the weight overcomes the force of the wind, and causes the return of the sails to their normal position, or with their faces presented at the proper angle to the wind, and to plane of rotation.

By changing the suspension-point of the weight on the lever the resistance to the movement of the sails may be increased or diminished at will, so as to hold the sails in an operative position until the wheel attains any given speed.

A great advantage is derived by mounting the wind-wheels on inclined shafts, as on prairies, where my invention is specially designed to be used for propelling vehicles, the winds generally pursue a downward direction, the force of which is generally expended without a proper action upon wind-wheels possessing horizontal shafts.

The two sets of wind-wheels, while balancing each other, as above described, will also permit wheels of smaller dimensions to be used, which is of great importance when employed for furnishing the motive power for propelling land-conveyances, as it enables the wheels to be brought near the ground or frame of the transporting-vehicle, thus steadying the movement of the latter, and preventing it from being upset by sudden gales or violent winds.

Having thus described my invention, what I claim as new, and desire to secure by Letters Patent, is—

1. The combination of the horizontally and reversely revolving wind-wheels H I, having self feathering or adjusting sails N', independent driving-shafts F, inclined bearing-blocks E, turn-table D, and central vertical power-transmitting shaft O, geared to the wheel-shafts, as and for the purpose set forth.

2. A wind-wheel of a conoidal or dished form, provided with a series of movable sails or blades, N', arranged and operating as set forth.

AUSTIN LOWE.

Witnesses:
M. T. IVY,
WILLIAM KIMBALL.